United States Patent

[11] 3,634,050

[72] Inventors Edward R. Corino
 Belleville;
 Edward F. Broderick, Bernardsville;
 Gerard P. Canevari, Cranford, all of N.J.
[21] Appl. No. 748,599
[22] Filed July 30, 1968
[45] Patented Jan. 11, 1972
[73] Assignee Esso Research and Engineering Company

[54] METHOD OF GELLING TANKER CARGOES
 4 Claims, No Drawings
[52] U.S. Cl. ................................................... 44/7 D
[51] Int. Cl. ................................................... C10l 7/02
[50] Field of Search ...................................... 44/7

[56] References Cited
UNITED STATES PATENTS

| | | | |
|---|---|---|---|
| 2,662,068 | 12/1953 | Floyd | 44/7 C |
| 2,859,234 | 11/1958 | Glem | 44/7 C |
| 3,064,047 | 11/1962 | Miller | 44/7 C |
| 3,097,168 | 7/1963 | Gibson | 44/7 D |

Primary Examiner—Benjamin R. Padgett
Attorneys—Manahan and Wright and Donald F. Wohlers ABSTRACT: The instant disclosure is directed to a method for solidifying marine tanker hydrocarbon cargoes to prevent the escape of the hydrocarbon from damaged compartments. The formation of suitable gels contain the hydrocarbon and thus avoid pollution of the sea and nearby shores. Gelling agents are disclosed which permit gellation to occur at a controlled rate, making them particularly suitable for use aboard tankers.

METHOD OF GELLING TANKER CARGOES

BACKGROUND OF THE INVENTION

The instant invention is directed to a method for effectively gelling hydrocarbon cargoes such as crude oil and the like which are carried in marine tankers. By use of the gelling agents and methods herein to be discussed, the danger of a gross oil spill from a tanker, possibly due to grounding, structural failure or collision, is avoided. By gelling the oil in the ruptured cargo tank, its escape is prevented. This, of course, avoids the series pollution problems which have often resulted heretofore. In addition, the gelled oil would help a strickened vessel retain some buoyancy since the oil cargo would not be displaced by water leaking into the damaged tank or tanks. Furthermore, even if the vessel should be a total loss as a result of complete structural failure, the gelled oil would float as a coherent mass and would not spread as a liquid oil would. This, of course, makes removal easier and also limits pollution to a much smaller area.

In order to find practical application aboard a tanker, a gelling agent must meet certain criteria. For example, it would be readily soluble in the crude oil and uniform distribution must require only a minimum of mixing energy and time. In addition, strong gels must be formed and these must form with no adjustments having to be made in the temperature of the cargo.

Another extremely important requirement is the ability to form a gel at a controlled rate. This is necessitated due to the fact that tanker cargo compartments are very large and a rapid gel reaction would not permit adequate distribution of the gelling agent in the oil and this would result in weak or nonrigid gels. Furthermore, if no control over the rate of gel formation was achieved, the result is a localized instant gellation in the area where the gelling agents are introduced into the cargo. This, of course, has the effect of preventing the addition or distribution of additional gelling agents and subsequently the entire content of the cargo tank can not be satisfactorily gelled.

A suitable gelling agent should also be stable in storage and nonhazardous to the crew members or to the ship itself; and, of course, it should be effective at low concentrations and hence low cost. Low concentrations also insure that sufficient amounts of gelling agent may be stockpiled at strategic locations for rapid and convenient movement to the stricken tanker. Low concentrations also reduce equipment size and time needed for injection into the damaged compartment.

In the past various methods have been proposed for gelling crude oil and other hydrocarbons. For example, use has often been made of certain organic polymers. However, because these materials are solids of high-molecular weight, they are extremely difficult to disperse, slow to become solvated and require extensive mixing and considerable periods of time, often 24 hours or longer, to achieve gellation. These materials, therefore are unacceptable for use aboard a tanker where distribution and mixing capabilities are very limited. Metallic soaps have also been used to thicken hydrocarbons, but the concentrations and mixing requirements are too high. In addition many require elevated temperatures to form the gel.

Attempts have been made in the past to form suitable gelling agents by the reaction of various chemicals insitu. Heretofore, this approach has also proven unsatisfactory in the above usage, since reactions were extremely fast (e.g., usually 0.3 to 1 second for gellation) and were, therefore, not satisfactory for large volumes. This follows from the fact that the gel-forming chemicals react primarily in the region of injection, leaving large volumes of the liquid ungelled.

SUMMARY OF THE INVENTION

According to the teachings of the instant invention, a controlled rate of gellation can be obtained by the insitu formation of certain gel promulgating molecules. Two systems have been developed which are suitable for use aboard tankers. One system produces a gel in 15 to 45 minutes, while the other system produces gels in periods of 3 to 18 hours. Both systems employ organic liquids of low-viscosity and high-oil solubility. The more rapid of the two systems is based upon the reaction between a diisocyanate, preferably a mixed isomer 2, 4 and 2, 6 toluene diisocyanate and a beta amine.

The second system is based upon $\gamma$-butyrolactone and cocoamine. $\gamma$-butyrolactone is an internal ester of a hydroxy acid while cocoamine is a naturally occurring mixture of primary amines of $C_8$ to $C_{18}$ chain length.

Because the above-mentioned reactants are the precursors of the gel-forming molecules themselves, they can be readily dissolved and uniformly distributed in the oil with a minimum of mixing and without any initial thickening of the oil. Then, the precursors react at a controlled rate and produce the gel-forming molecules. Since the gel-forming product is formed insitu and since the reactants forming this product are well distributed in the crude, gellation of the oil is extremely effective. The use of these reactants in the method of the instant invention avoids the distribution and mixing problems associated with high-polymer gelling agents. Also by enabling the rate of reaction to be controlled, the system avoids the problems associated with very rapid gelling systems. As heretofore indicated, this is necessary because it is the only way in which a practical system for gelling large volume tanker compartments may be obtained.

Thus, it is an object of the instant invention to provide an effective method of gelling the cargo of a crude oil tanker so as to prevent spillage in case of the structural failure of the tanker hold.

Another object is to provide a gelling system for crude oil and other hydrocarbons, which system is effective at low concentrations, produces stable gels, is readily introduced into the material to be gelled, reacts spontaneously insitu, and is capable of promulgating gel formation at a controlled rate.

These and other objects as well as a fuller understanding of the invention may be had from the following detailed description.

In a typical application the above-described gel precursors may be utilized as follows:

Assuming, for example, that a leak develops in a compartment containing crude oil, the first component, e.g., the mixed isomer of toluene diisocyanate, would be introduced into the cargo in the leaking compartment. This may be readily accomplished by pumping the diisocyanate to a flexible hose having at its terminus a swivel head which dispenses material through a plurality of nozzles as the head rotates, such as one manufactured by Butterworth System, Inc. This type of equipment is normally to be found on tankers and is usually used to wash down the compartment walls after the cargo has been removed. The flexible hose would be lowered into the compartment while pumping the diisocyanate to the head. Upon approaching the bottom of the damaged compartment, the second component would be fed through a parallel hose to the head. In this case, it would be the beta amine and it would be supplied to the head while the assembly was being raised from the bottom area of the tank. It will be appreciated that the use of a head of the type described permits some degree of mixing, since the head rotates as material is fed through it. Since a compartment has provisions for several heads, two or more could be used simultaneously for improved distribution and more rapid injection. As heretofore mentioned, since mixing requirements are minimal, the limited degree of mixing achieved with the use of a rotating head can be sufficient. If additional mixing is needed for viscous crudes, gas sparging into the liquid will be adequate. Gel formation proceeds at a controlled rate and will normally not occur until a predetermined time after the head has been removed from the damaged tank. The use of a rotating-type head, while preferred, is not to be taken as limiting the invention, as obviously other means for introducing the gel precursors into the cargo in the damaged tank are also applicable.

When using the system based upon 2, 4 and 2, 6 toluene diisocyanate and a beta amine, which amine preferably consists of amine compounds of 12–20 carbon atom length with the amine group attached at the beta position, the reaction proceeds according to the following equation:

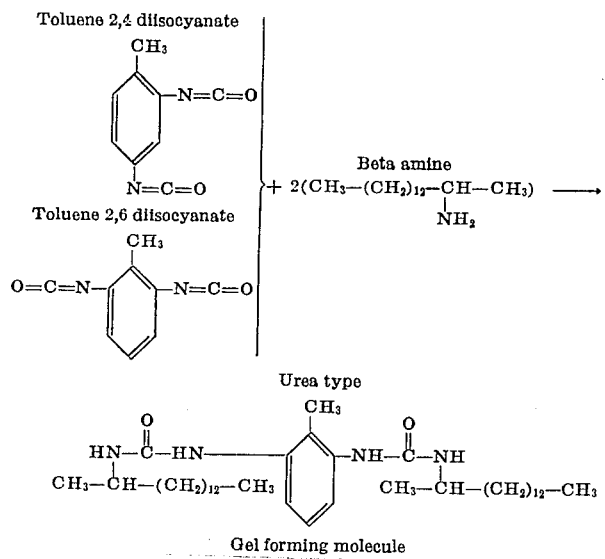

The urea-type compound resulting from this reaction is the actual gel-forming molecule. It will be appreciated that the strength of the gel achieved is a function of agent concentration and the type of material or crude to be gelled. Table I presents data indicating the strength of the rigid gels produced when using the above reactants.

TABLE I

GEL STRENGTHS WITH TOLUENE DIISOCYANATE (TDI)—

BETA AMINE SYSTEM

Concentration Gel

| Agent TDI | Beta Amine | Oil Gelled | Yield Stress (dynes/cm.²) |
|---|---|---|---|
| 0.46% | 1.54% | Louisiana Crude | 4,000 |
| 0.58 | 1.92 | Louisiana Crude | 5,000 |
| 0.69 | 2.31 | Louisiana Crude | 9,000 |
| 0.92 | 3.08 | Louisiana Crude | 11,000 |
| 0.46 | 1.54 | Kuwait Crude | Nonrigid gel |
| 0.58 | 1.92 | Kuwait Crude | 3,900 |
| 0.69 | 2.31 | Kuwait Crude | 4,500 |
| 0.92 | 3.08 | Kuwait Crude | 8,000 |

The second system, i.e., the one based upon γ-butyrolactone and cocoamine, may be utilized in a fashion substantially identical to the utilization of the first system. As hereinbefore indicated, γ-butyrolactone is an internal ester of a hydroxy acid while the cocoamine is a naturally occurring mixture of primary amines of $C_8$ to $C_{18}$ chain length. An approximate breakdown of the molecules in cocoamine according to the number of carbon atoms they contain is given in table II.

TABLE II

CONSTITUENTS OF COCOAMINE

| | | | |
|---|---|---|---|
| $C_8$ | 7% | $C_{14}$ | 19.0% |
| $C_{10}$ | 6.5% | $C_{16}$ | 8.5% |
| $C_{12}$ | 53.0% | $C_{18}$ | 1.0% |
| Unsaturated $C_{18}$ | | 5% | |

As shown in the reaction equation below, the reaction between these two materials produces an hydroxy-butyramide which is the gel-forming molecule.

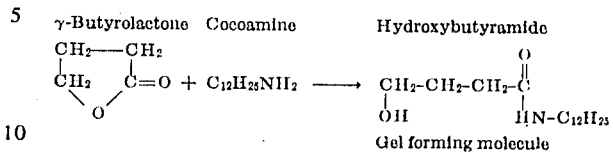

The instant system has extremely low-mixing requirements and gives strong gels. As shown in table III, the gel strength is a function of concentration and oil type and for some oils rigid gels are produced at concentrations as low as 1.5 percent.

TABLE III.—GEL STRENGTHS WITH γ-BUTYROLACTONE AND COCOAMINE

| Concentration of gelling agents (percent) | | | |
|---|---|---|---|
| γ-Butyro-lactone | Cocoamine | Oil gelled | Yield stress (dynes/cm.²) |
| .5 | .75 | Louisiana Crude | 14,300 |
| .3 | .7 | ...do... | 19,000 |
| .6 | 1.4 | ...do... | 43,000 |
| .9 | 2.1 | ...do... | 94,000 |
| .5 | .75 | Kuwait Crude | 5,800 |
| .6 | 1.4 | ...do... | 22,000 |
| 1.0 | 1.5 | ...do... | 28,000 |
| .9 | 2.1 | ...do... | 37,500 |
| .6 | 1.4 | Bunker C | 11,000 |
| .9 | 2.1 | ...do... | 20,000 |
| 1 | 2.37 | ...do... | >30,000 |

This system is also unique in that a modest increase in temperature of the gel, e.g., raising its temperature up to about 135° to about 145° F., will reconvert the gel back to liquid form. This is of high-economic value since once the danger of spillage has passed, it would serve as a means for recovering the valuable cargo. Since the gelling compound is organic, the recovered oil could be used or processed in a normal manner, provided it was kept at a sufficient temperature or diluted enough to prevent regellation which would occur on cooling.

While the instant invention has been presented in some detail, this has been done by way of illustration and not by way of limitation. For example, it will be appreciated by those skilled in the art that the use of the instant invention in gelling cargoes on marine tankers is just one example of several possible uses. Obviously the teachings of the instant invention are also applicable to the gelling of the contents of land based storage tanks as well as to other areas where it is desirable to decrease the fluidity of a liquid. Thus, in determining the full scope of the invention, reference should be had to the following appended claims.

What is claimed is:

1. A method for decreasing the fluidity of a normally liquid hydrocarbon which comprises forming the reaction product of γ-butyrolactone and cocoamine insitu in said hydrocarbon.

2. The method of claim 1 wherein the amount of γ-butyrolactone used is from about 0.5 to about 2 weight percent, based on said hydrocarbon and the amount of cocoamine used is from about 0.75 to about 3 weight percent.

3. A method for gelling hydrocarbon in marine cargo holds which comprises the following steps in combination; introducing into said oil from about 0.5 to about 2 weight percent, based on said oil, of γ-butyrolactone and thereafter introducing in said oil from about 0.75 to about 3 weight percent of cocoamine whereby the reaction product of said γ-butyrolactone and said cocoamine forms insitu in said oil and said reaction product gels said oil.

4. A method for preventing the escape of a hydrocarbon from a ruptured storage vessel which comprises gelling said oil by forming the reaction product of γ-butyrolactone and cocoamine insitu in said oil.

* * * * *